United States Patent
Shin et al.

(10) Patent No.: US 12,544,658 B2
(45) Date of Patent: Feb. 10, 2026

(54) FISHING SIMULATION APPARATUS AND METHOD

(71) Applicant: P&I COMPANY, Jeju-si (KR)

(72) Inventors: Jea Joong Shin, Jeju-si (KR); Eun Seok Youn, Seoul (KR)

(73) Assignee: P&I COMPANY, Jeju-si (KR)

( * ) Notice: Subject to any disclaimer, the term of this patent is extended or adjusted under 35 U.S.C. 154(b) by 708 days.

(21) Appl. No.: 17/770,867

(22) PCT Filed: Oct. 21, 2020

(86) PCT No.: PCT/KR2020/014406
§ 371 (c)(1),
(2) Date: Apr. 21, 2022

(87) PCT Pub. No.: WO2021/080315
PCT Pub. Date: Apr. 29, 2021

(65) Prior Publication Data
US 2022/0370897 A1     Nov. 24, 2022

(30) Foreign Application Priority Data
Oct. 25, 2019   (KR) .................. 10-2019-0133929

(51) Int. Cl.
*A63F 13/245* (2014.01)
*A63F 13/818* (2014.01)
*G02B 27/01* (2006.01)

(52) U.S. Cl.
CPC .......... *A63F 13/245* (2014.09); *A63F 13/818* (2014.09); *A63F 2300/1043* (2013.01);
(Continued)

(58) Field of Classification Search
CPC .................. A63F 13/245; A63F 13/818; A63F 2300/1043; A63F 2300/8035;
(Continued)

(56) References Cited

U.S. PATENT DOCUMENTS

| | | | | |
|---|---|---|---|---|
| 2,557,789 A | * | 6/1951 | Lamka | A63F 9/34 446/139 |
| 2,747,872 A | * | 5/1956 | Harvey | A63F 9/34 273/443 |

(Continued)

FOREIGN PATENT DOCUMENTS

| | | | | |
|---|---|---|---|---|
| GB | 2 174 209 A | * | 10/1986 | G09B 9/00 |
| JP | H03-007979 A | * | 1/1991 | G09B 9/00 |

(Continued)

OTHER PUBLICATIONS

Machine translation of KR 20160122004 A, copyright 2024 Clarivate Analytics, downloaded Dec. 28, 2024 from PE2E Search.*
(Continued)

*Primary Examiner* — David L Lewis
*Assistant Examiner* — Matthew D Hoel
(74) *Attorney, Agent, or Firm* — NKL Law; Jae Youn Kim

(57) ABSTRACT

A fishing simulation apparatus include: a fishing reel which is mounted on a fishing rod and provided with a manual driving pulley for winding up a fishing line, and which moves the fishing line in opposite directions; and a main motor for pulling the connected fishing line from the fishing rod and the fishing reel, in which the fishing line is connected in an infinite circulation manner, sequentially passing through the fishing rod, the fishing reel, and the main motor.

14 Claims, 15 Drawing Sheets

(52) U.S. Cl.
CPC .............. *A63F 2300/8035* (2013.01); *A63F 2300/8082* (2013.01); *G02B 2027/0141* (2013.01); *G02B 27/017* (2013.01)

(58) Field of Classification Search
CPC .......... A63F 2300/8082; G02B 27/017; G02B 2027/0141; A01K 87/00
See application file for complete search history.

(56) References Cited

U.S. PATENT DOCUMENTS

| | | | | |
|---|---|---|---|---|
| 3,646,691 | A * | 3/1972 | French | A63H 33/30 434/247 |
| 3,764,138 | A * | 10/1973 | Schild | A63F 9/305 273/447 |
| 3,864,872 | A * | 2/1975 | Hoetzel | A63F 9/34 273/448 |
| 4,165,075 | A * | 8/1979 | Popovich | A63F 9/34 273/140 |
| 4,272,075 | A * | 6/1981 | Rogers, Jr. | A63F 9/34 273/448 |
| 4,637,603 | A * | 1/1987 | Fry | A01K 97/00 434/247 |
| 4,752,878 | A * | 6/1988 | Sigurdsson | A01K 89/017 43/4.5 |
| 4,976,439 | A * | 12/1990 | Kraemer | A63F 9/305 273/350 |
| 5,110,136 | A * | 5/1992 | Land | A63F 9/305 273/348.4 |
| 5,232,223 | A * | 8/1993 | Dornbusch | A63F 13/428 463/37 |
| 5,334,027 | A * | 8/1994 | Wherlock | A63B 23/12 434/247 |
| 5,334,603 | A * | 8/1994 | Shankar | C07D 285/125 514/363 |
| 5,335,911 | A * | 8/1994 | Brown | A63F 9/34 446/139 |
| 5,397,131 | A * | 3/1995 | Kraemer | A63F 9/305 273/350 |
| 5,542,672 | A * | 8/1996 | Meredith | G05G 1/085 463/7 |
| 5,615,881 | A * | 4/1997 | Potter | A63F 9/305 273/140 |
| 5,713,792 | A * | 2/1998 | Ohzono | A63B 21/153 463/7 |
| 6,162,123 | A * | 12/2000 | Woolston | A63F 13/54 463/37 |
| 6,290,565 | B1 * | 9/2001 | Galyean, III | A63H 3/16 446/99 |
| 6,312,335 | B1 * | 11/2001 | Tosaki | A63F 13/245 463/37 |
| 6,319,128 | B1 * | 11/2001 | Miyoshi | A63F 13/45 463/31 |
| 6,354,948 | B1 * | 3/2002 | Nagayama | A63F 13/5375 345/184 |
| 6,364,764 | B1 * | 4/2002 | Suzuki | A63F 13/245 463/7 |
| 6,368,211 | B1 * | 4/2002 | Suzuki | A63F 13/58 463/43 |
| 6,402,617 | B2 * | 6/2002 | Gouji | A63F 13/537 463/31 |
| 6,402,626 | B1 * | 6/2002 | Beaty | A63G 19/20 434/247 |
| 6,422,943 | B2 * | 7/2002 | Shinohara | A63F 13/22 463/43 |
| 6,550,774 | B1 * | 4/2003 | Stroll | G07F 17/3297 273/447 |
| 6,589,117 | B1 * | 7/2003 | Moritome | A63F 13/44 463/7 |
| 6,602,132 | B2 * | 8/2003 | Kozawa | A63F 13/818 463/7 |
| 6,612,929 | B2 * | 9/2003 | Fujimoto | A63F 13/245 463/32 |
| 6,620,043 | B1 * | 9/2003 | Haseltine | A63B 21/0058 273/317.1 |
| 6,752,716 | B1 * | 6/2004 | Nishimura | A63F 13/285 434/69 |
| 6,776,717 | B2 * | 8/2004 | Shinohara | A63F 13/22 463/36 |
| 6,784,561 | B2 * | 8/2004 | Ootori | A63F 13/24 290/1 R |
| 7,113,166 | B1 * | 9/2006 | Rosenberg | G09B 9/00 345/157 |
| D530,753 | S * | 10/2006 | Corley | D21/328 |
| 7,158,112 | B2 * | 1/2007 | Rosenberg | A63F 13/812 345/156 |
| 8,414,301 | B2 * | 4/2013 | Dean | G09B 19/0038 434/247 |
| 8,579,707 | B2 * | 11/2013 | Lin | A63F 13/285 463/37 |
| 8,992,322 | B2 * | 3/2015 | Endo | A63F 13/812 463/37 |
| 9,770,652 | B2 * | 9/2017 | Barney | A63F 13/65 |
| 9,814,973 | B2 * | 11/2017 | Barney | A63F 13/69 |
| 9,861,887 | B1 * | 1/2018 | Briggs | A63F 13/25 |
| 9,931,578 | B2 * | 4/2018 | Weston | A63J 21/00 |
| 9,993,724 | B2 * | 6/2018 | Barney | A63F 13/92 |
| 10,010,790 | B2 * | 7/2018 | Weston | A63F 13/80 |
| 10,188,953 | B2 * | 1/2019 | Barney | A63F 13/822 |
| 10,478,719 | B2 * | 11/2019 | Weston | A63F 13/30 |
| 11,179,621 | B2 * | 11/2021 | Hovland | G01P 3/487 |
| 11,235,195 | B2 * | 2/2022 | Gregory | A63B 21/4033 |
| 2001/0021665 | A1 * | 9/2001 | Gouji | A63F 13/525 463/7 |
| 2003/0138766 | A1 * | 7/2003 | Au | G09B 19/00 434/365 |
| 2004/0138029 | A1 * | 7/2004 | Brausen | A01K 97/00 482/130 |
| 2004/0166937 | A1 * | 8/2004 | Rothschild | G07F 17/32 463/36 |
| 2005/0209741 | A1 * | 9/2005 | Cunningham | G05D 16/2066 700/301 |
| 2007/0102884 | A1 * | 5/2007 | Hinz | A63F 9/02 273/317.2 |
| 2007/0238523 | A1 * | 10/2007 | Kim | A63F 13/55 463/40 |
| 2007/0270219 | A1 * | 11/2007 | Sugioka | A63F 13/211 463/37 |
| 2008/0015017 | A1 * | 1/2008 | Ashida | A63F 13/803 463/37 |
| 2009/0079135 | A1 * | 3/2009 | Norbits | A63F 9/305 273/348.5 |
| 2009/0241636 | A1 * | 10/2009 | Obori | G06F 3/017 73/12.04 |
| 2010/0022366 | A1 * | 1/2010 | Hoover | A63B 21/4043 482/121 |
| 2010/0130274 | A1 * | 5/2010 | Takahashi | A63F 13/30 463/31 |
| 2010/0255913 | A1 * | 10/2010 | Kidakarn | A63F 13/98 463/37 |
| 2010/0279771 | A1 * | 11/2010 | Block | A63F 13/98 463/37 |
| 2011/0244962 | A1 * | 10/2011 | Kidakarn | A63F 13/245 463/36 |
| 2011/0306425 | A1 * | 12/2011 | Rivard | A63F 13/24 463/37 |
| 2014/0250761 | A1 * | 9/2014 | Preller, Jr. | A01K 89/08 43/17 |
| 2015/0196846 | A1 * | 7/2015 | Shih | A63F 13/65 463/31 |
| 2015/0362996 | A1 * | 12/2015 | Nishimura | A63F 13/285 463/30 |
| 2016/0030850 | A1 * | 2/2016 | Sophos | A63F 13/30 463/2 |
| 2017/0046882 | A1 * | 2/2017 | Lane | A63F 13/23 |
| 2021/0346790 | A1 * | 11/2021 | Washington | A63F 9/34 |
| 2022/0347555 | A1 * | 11/2022 | Eugenia | A63F 9/34 |
| 2022/0370897 | A1 * | 11/2022 | Shin | A63F 13/245 |

(56) References Cited

U.S. PATENT DOCUMENTS

| | | | | |
|---|---|---|---|---|
| 2023/0182003 A1 * | 6/2023 | Teeven | ............... | A63F 9/305 |
| | | | | 273/330 |
| 2024/0091632 A1 * | 3/2024 | Lowrance | ............ | A63F 9/305 |
| 2024/0189715 A1 * | 6/2024 | Comer | ............ | A63F 13/533 |
| 2024/0207716 A1 * | 6/2024 | Naas | ............ | A63F 3/0423 |

FOREIGN PATENT DOCUMENTS

| | | | | | |
|---|---|---|---|---|---|
| JP | H03-007980 A | * | 1/1991 | ............ | G09B 9/00 |
| JP | H03-007981 A | * | 1/1991 | ............ | G09B 9/00 |
| JP | H07-248723 A | * | 9/1995 | ............ | G09B 9/00 |
| JP | 09-000740 A | | 1/1997 | | |
| JP | 3069377 U | | 6/2000 | | |
| KR | 10-2016-0122004 A | | 10/2016 | | |
| KR | 20160122004 A | * | 10/2016 | ......... | A63F 13/818 |
| KR | 10-2018-0063604 A | | 6/2018 | | |
| KR | 10-2018-0134221 A | | 12/2018 | | |
| RU | 2473131 C2 | * | 1/2013 | ............ | G09B 9/00 |
| WO | 2004-082771 A2 | | 9/2004 | | |
| WO | WO 2024/203434 A1 | * | 10/2024 | ............ | G09B 9/00 |

OTHER PUBLICATIONS

Written opinion of PCT/KR2020/014406, downloaded from wipo.int, Dec. 28, 2024.*

International preliminary report on patentability of PCT/KR2020/014406, downloaded from wipo.int, Dec. 28, 2024.*

International search report of PCT/KR2020/014406, downloaded from wipo.int, Dec. 28, 2024.*

Machine translation of JP H09-000740 A, downloaded from worldwide.espacenet.com, Dec. 28, 2024.*

* cited by examiner

FISHING SIMULATION APPARATUS AND METHOD

TECHNICAL FIELD

The present invention relates to a fishing simulation apparatus and method, and more particularly to a fishing simulation apparatus and method capable of realistically implementing winding of a fishing line together with a program provided as an image according to the behavior of fishing, whereby it is possible to provide the same level of realism as real fishing.

BACKGROUND ART

As is generally known, electronic entertainment games using programs have been widely used by children and teenagers for a long time. In recent years, online games have been rapidly popularized by virtue of advanced PCs and expanded availability of ultrahigh-speed Internet, whereby online games have been positioned as a culture that everyone can conveniently enjoy regardless of age and sex.

The game industry has made rapid strides based thereon, and kinds of games have been increased from simple brain games to various battle games, sports games, and motorcycle or car racing games, whereby users may select and enjoy appropriate games according to their tastes.

An apparatus developed to simulate such a game in a more realistic situation such that a real situation can be experienced through a simulation apparatus. The simulation apparatus virtually simulates a situation that may actually occur using a computer program to provide a user with indirect experience. A virtual three-dimensional situation is programmed, and three-dimensional operation is performed by the simulation apparatus, whereby the user feels motion like a real situation, and this is applied to various situations such that a virtual situation is experienced as a real situation.

The simulation apparatus may be applied to various fields, such as various kinds of games, various experiences through simulation, and three-dimensional movie watching.

Furthermore, the simulation apparatus is connected to a virtual reality apparatus due to the characteristics of the simulation apparatus, which enables three-dimensional sensation to be felt, in order to obtain a greater synergistic effect.

In general, the virtual reality apparatus generates video and audio through a head mounted display (HMD) having a monitor and a speaker mounted thereto in order to provide virtual reality to a user.

That is, dynamic change based on a virtual environment is reproduced through the HMD and peripheral devices controlled by a computer such that a user can feel virtual reality as real reality, and the virtual reality apparatus has been popularized in many fields.

In recent years, such virtual reality has been applied to fishing, and a system capable of enabling fishing to be experienced indoors has been introduced.

However, a fishing simulation apparatus is an apparatus that simulates change of fish, which is an opponent, unlike a general simulation apparatus that simulates motion of a user, wherein there are many variables, and therefore it is difficult to properly simulate the same.

Korean Patent Application Publication No. 10-2018-0134221 discloses a fishing line driving apparatus for screen fishing included in a screen fishing system that provides a fishing simulation image through a screen, the fishing line driving apparatus for screen fishing including a main motor configured to provide driving force, a towing unit connected to a fishing line of a fishing rod so as to be operated by the driving force of the main motor, the towing unit being configured to pull the fishing line in a direction toward the screen or to unwind the fishing line in a direction toward the fishing rod, and a clutch unit installed between the towing unit and the main motor, the clutch unit being configured to transmit the driving force of the main motor to the towing unit or to interrupt transmission of the driving force of the main motor to the towing unit, wherein motion of a fish and the thrill at hand are provided by winding or unwinding of the fishing line by the main motor.

However, the above patent application publication has the following problems.

In Korean Patent Application Publication No. 10-2018-0134221, one end of the fishing line is fixed to the fishing rod, and the other end of the fishing line is fixed to the motor, whereby the length of the fishing line is limited. In this case, it is difficult to feel sufficient realism during casting and reeling, and the fishing line may be easily entangled during winding and unwinding of the fishing line having the limited length.

In addition, after fishing is successful, i.e. a fish is caught, the fishing line must be wound by the main motor for original setting, whereby waiting time is necessary. Furthermore, a bobbin necessary to wind the fishing line must be provided at the motor and a reel, and therefore the volume of the apparatus is increased.

These problems may act as obstacles in simulating a situation similar to reality when virtual fishing is performed.

DISCLOSURE

Technical Problem

It is an object of the present invention to provide a fishing simulation apparatus and method capable of simulating a more realistic fishing situation.

It is another object of the present invention to provide a fishing simulation apparatus and method capable of using a fishing line having an infinite length, whereby it is possible to perform realistic casting and reeling.

It is a further object of the present invention to provide a fishing simulation apparatus capable of preventing tangling of a fishing line and resuming fishing without separate setting after fishing is successful, whereby it is possible to more conveniently and realistically enjoy fishing.

Technical Solution

In order to accomplish the above objects, a fishing simulation apparatus according to the present invention includes a fishing reel mounted to a fishing rod, the fishing reel being provided with a manual driving pulley configured to allow a fishing line to be wound therearound such that the fishing line is movable in both directions and a main motor configured to tow the fishing line connected to the fishing rod and the fishing reel, wherein the fishing line is connected in an infinite circulation manner while sequentially passing through the fishing rod, the fishing reel, and the main motor.

Consequently, a user who performs fishing may use the fishing rod as in reality, may enjoy fishing experiences under various situations depending on various states of the fishing line manipulated by driving of the main motor according to a sensor and a program. In addition, the fishing line may be infinitely rotated, whereby the length of the fishing line is not limited when the fishing line is pulled and tangling of the fishing line may be prevented.

As another characteristic of the present invention, the driving pulley may be engaged with an idler pulley, the idler pulley may include an input pulley and an output pulley, i.e. two pulleys, and the input pulley and the output pulley may be installed at an outer circumferential surface of the driving pulley so as to be adjacent to each other, whereby the fishing line may contact the outer circumferential surface of the driving pulley as much as possible such that frictional force is increased, and at the same time separation of the fishing line may be prevented.

As another characteristic of the present invention, the output pulley may be installed at a free end of a tensioner configured to be turned about a hinge, and a spring may be installed at the tensioner such that the output pulley elastically contacts the driving pulley.

As another characteristic of the present invention, a guide tube configured to allow the fishing line to pass therethrough may be further installed at a position adjacent to the driving pulley or the idler pulley engaged with the driving pulley, whereby separation of the fishing line may be prevented and the fishing line may be protected from contact or friction with surrounding objects.

As another characteristic of the present invention, a bail configured to be turned about a hinge and a limit switch configured to allow a free end of the bail to selectively come into contact therewith may be installed at the fishing reel, and a signal for unwinding the fishing line or maintaining tension of the fishing line may be applied to the main motor as the result of contact between the bail and the limit switch.

That is, a user's manipulation intention for winding or unwinding the line may be transmitted to the program, whereby a sensor function for the main motor to wind or unwind the fishing line may be performed.

As another characteristic of the present invention, the main motor may include a belt driving pulley configured to allow the fishing line to be wound therearound and a plurality of auxiliary pulleys, and the fishing line wound around an outer circumferential surface of the belt driving pulley may be wrapped by a belt outside the fishing line, whereby the fishing line is driven without slip.

As another characteristic of the present invention, a leftward-rightward moving plate configured to be moved leftwards and rightwards by a leftward-rightward moving motor may be installed in front of the fishing rod, a forward-rearward moving plate configured to be moved forwards and rearwards by a forward-rearward moving motor may be installed at a lower side of the leftward-rightward moving plate, the main motor may be installed at the forward-rearward moving plate so as to be moved together therewith, and a guide slot may be formed in the leftward-rightward moving plate so as to extend in a forward-rearward direction such that the fishing line is connected to the main motor.

Consequently, a situation in which a fish caught by the fishing line moves forwards, rearwards, leftwards, and rightwards may be simulated, whereby greater realism may be achieved.

Preferably, a bush configured to allow the fishing line to pass therethrough is installed at an upper end of the main motor so as to extend through the guide slot such that the fishing line is stably connected to the main motor even though the main motor is moved.

As another characteristic of the present invention, a display unit configured to audio visually display a virtual space according to a program input to drive the main motor may be provided.

The display unit may be constituted by any one of an HMD, a screen, and a display panel.

As another characteristic of the present invention, the fishing simulation apparatus may further include a tracking sensor configured to sense motion of the fishing rod and to output a signal corresponding thereto, and therefore the program may simulate an appropriate response situation depending on the manipulated state of the fishing line.

The present invention provides a fishing simulation method including a first step in which, when a user wears an HMD and holds a fishing rod, tracking sensing is recognized by a processor, and a fishing line is unwound by a main motor such that the fishing line is in a loosened state, a second step in which, when bait is cast using the fishing rod, the bait is sent far away in a virtual space based on a value calculated by the processor recognizing the speed at which the bait is cast by the arm, when the loosened fishing line is wound, torque of the main motor by the tension of the fishing line is maintained, the position of the cast bait and the distance from the cast bait are calculated by an encoder of the main motor, and the calculated position and distance are transmitted to the processor as a signal to maintain tension of the fishing line, a third step in which the main motor is rotated in alternating directions at short intervals in order to simulate fish biting at bait during waiting for fish, a fourth step in which, when a fish is caught, change data in length of the fishing line due to fluctuation and movement of the fish are synchronized with the rotation number of the motor, and the main motor is rotated in alternating directions through proportional control, whereby thrashing of the fish is simulated, a fifth step in which, when a handle of a fishing reel is rotated, the main motor is rotated according to winding force of the reel, and rotation data acquired by the encoder are transmitted, whereby the distance from the fish is decreased in the virtual space, and a sixth step in which, when fishing is successful, the fish is stored in a water tank, and the game is restarted, wherein, when the fishing reel is wound at higher than allowable torque proportional to the size of the fish or when the fishing rod is excessively pulled in the fifth step, the main motor is rapidly rotated in an unwinding direction to loosen the fishing line, whereby a situation in which the line is cut is simulated in the virtual space, and the game is restarted such that the above routine is repeated.

Advantageous Effects

A fishing simulation apparatus according to the present invention as described above has an effect that a fishing line configured to be continuously circulated infinitely is used, whereby the length of the fishing line is not limited, and therefore it is possible to enjoy sufficient casting and reeling.

The present invention has an effect in that tangling of the fishing line is prevented, and when fishing is finished or the game is to be restarted during the game, rewinding of the fishing line is unnecessary, which overcomes inconvenience in resetting, such as rewinding, of the fishing line, whereby it is possible to more conveniently and realistically enjoy virtual fishing.

The present invention has an effect in that the fishing line is rotated infinitely, whereby it is possible to feel tensile force directly applied to a reel in real time.

The present invention has an effect in that the fishing line is wound around a pulley of a motor or a pulley of a fishing reel without slip, whereby it is possible to perform stable fishing.

BEST MODE

Figure 1:
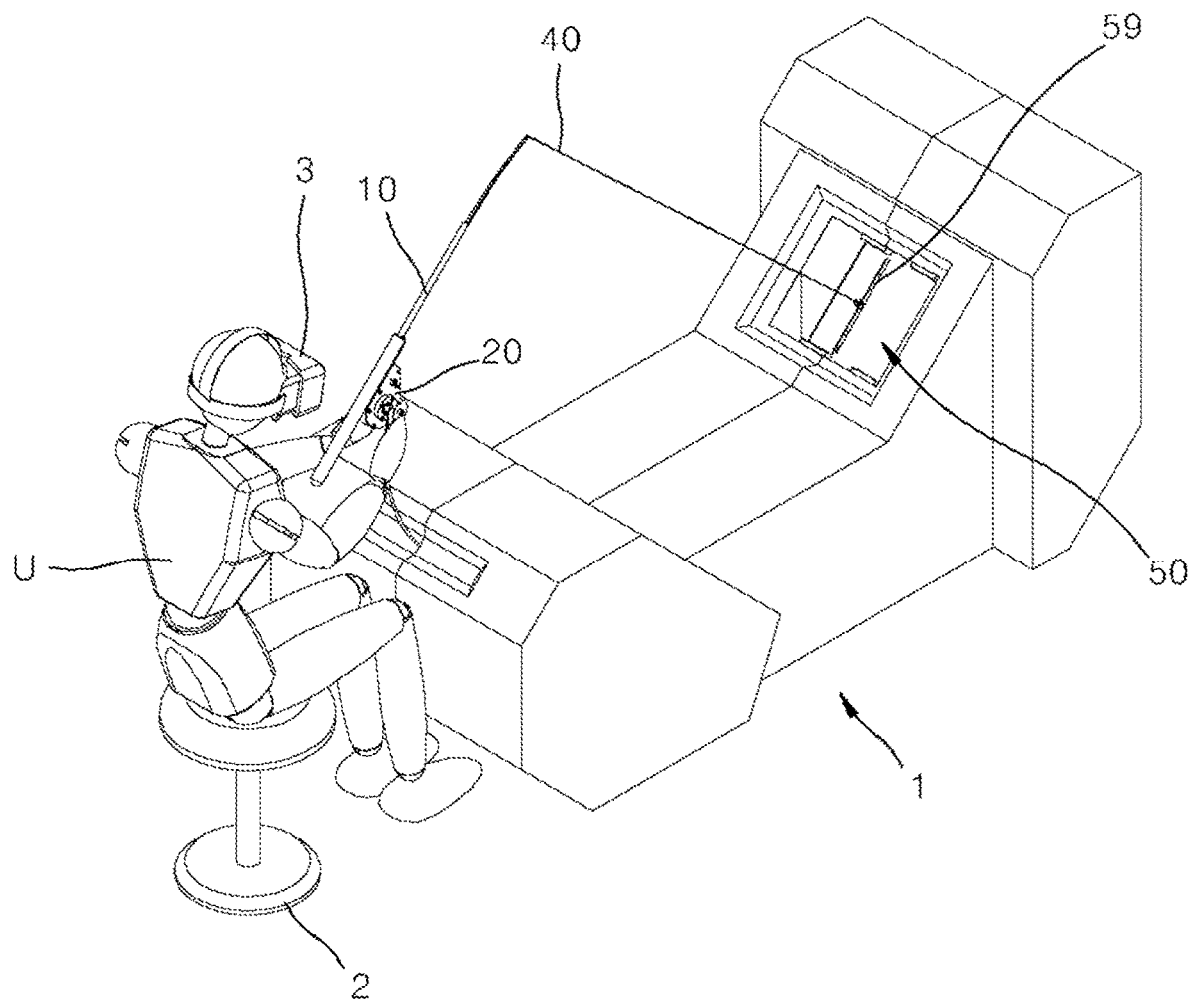
FIG. 1 is a perspective view showing an example of a fishing simulation apparatus according to the present invention.

Hereinafter, embodiments of the present invention will be described in detail with reference to the accompanying drawings.

Terms used in the following description, which are defined taking into consideration functions in the present invention, may vary depending upon the intention of users or operators or upon usual practices. Therefore, the definition of such terms must be made based on the disclosure of this specification.

Elements having the same names in this embodiment are denoted by the same reference numerals in the drawings, and an output direction and an input direction of a fishing line are set based on a user's operation of winding a reel, whereby winding of the fishing line from a front end to a rear of a fishing rod is set as the input direction.

Figure 2:
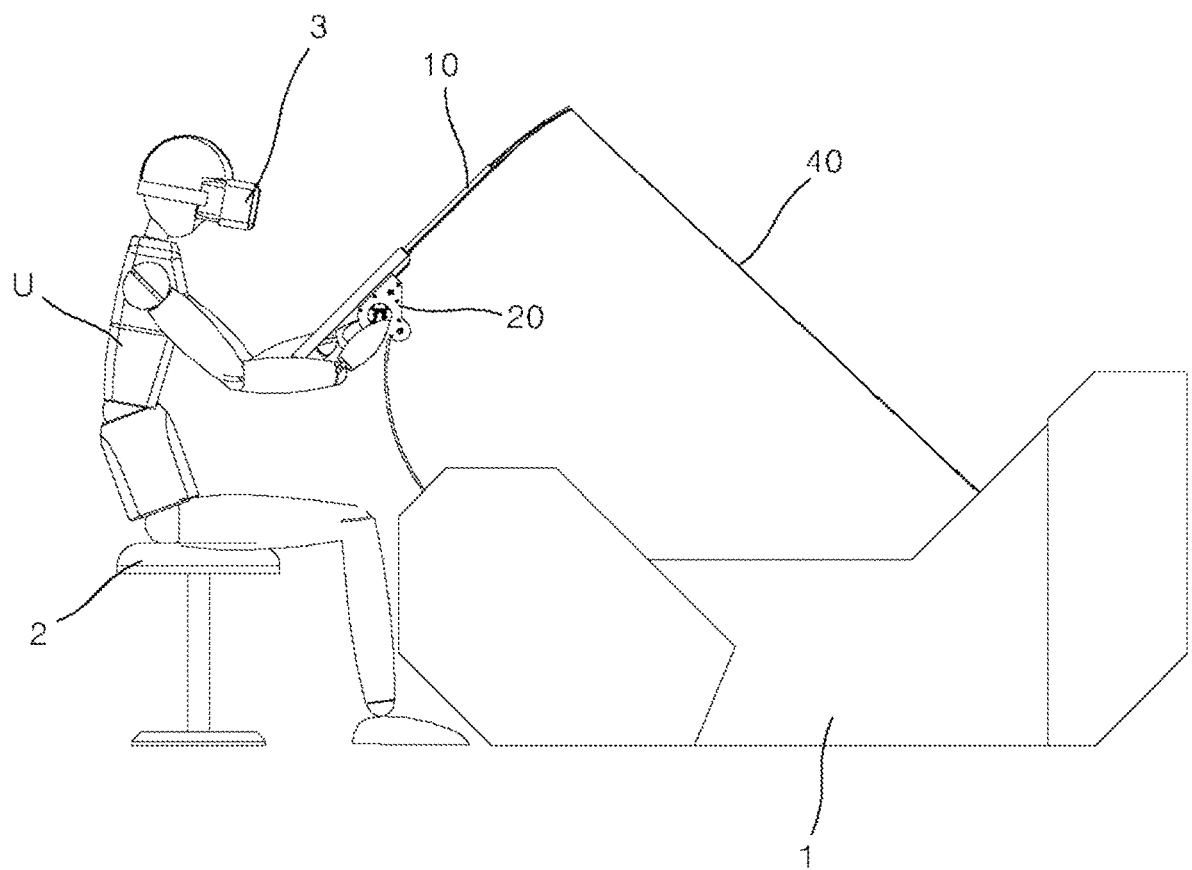
FIG. 2 is a side view of FIG. 1.
Figure 3:
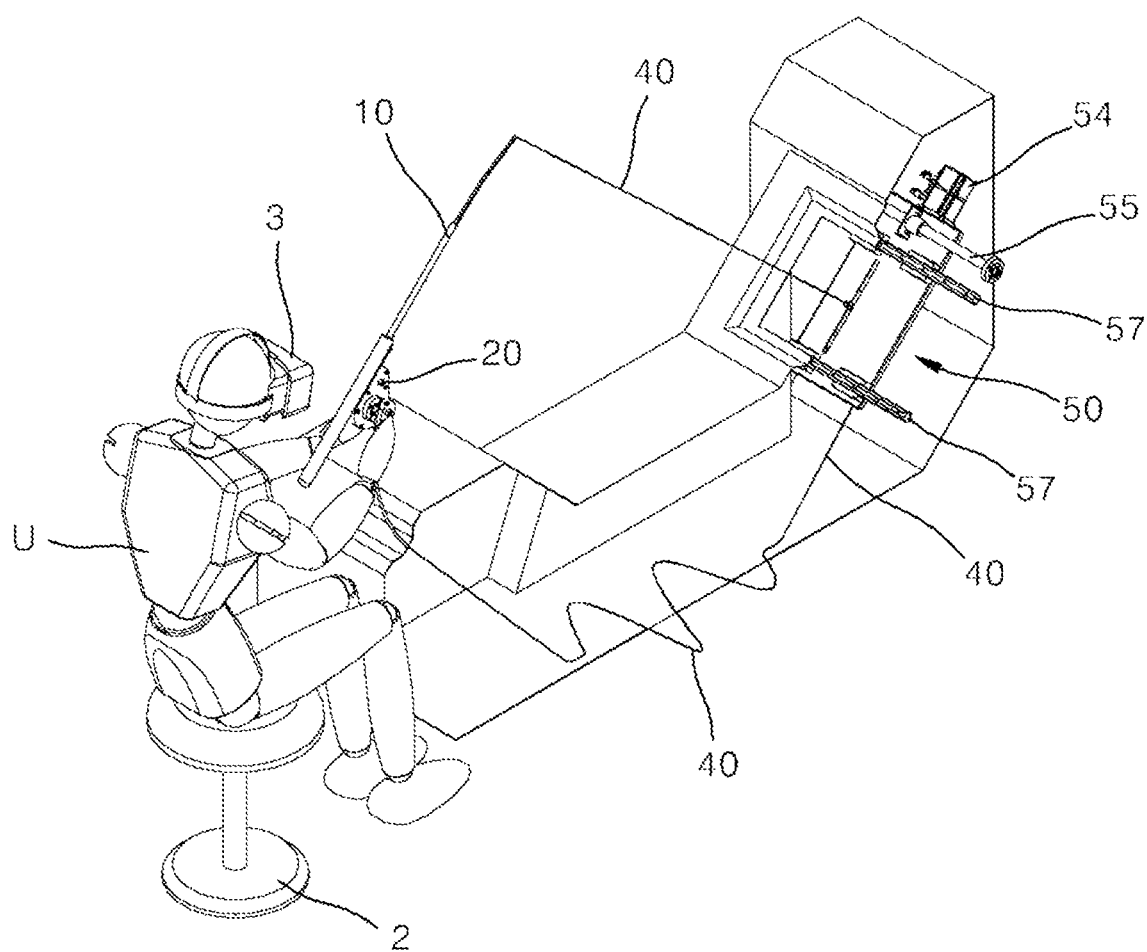
FIG. 3 is a cutaway perspective view showing half of the apparatus of FIG. 1.
Figure 4:
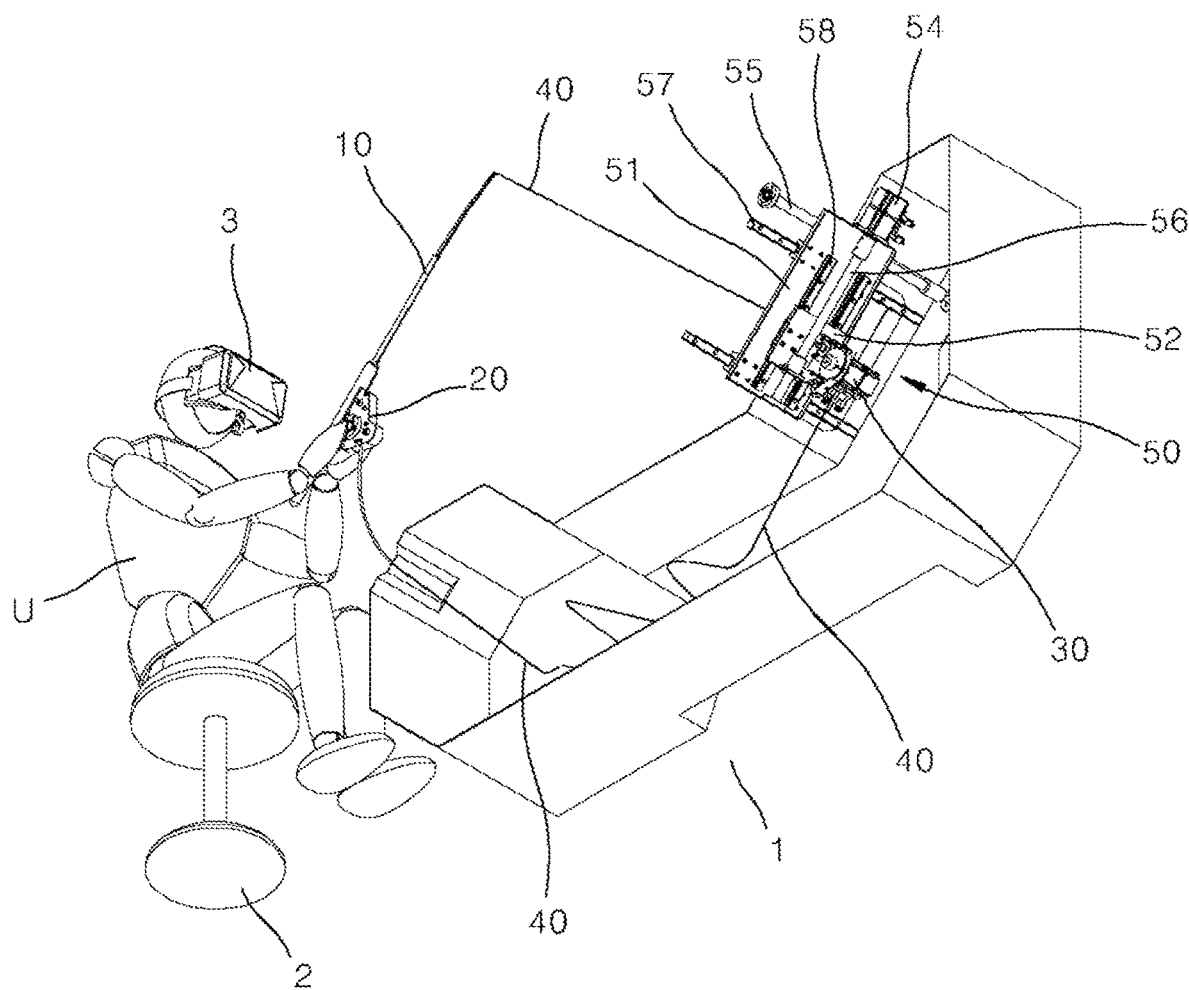
FIG. 4 is a bottom perspective view of FIG. 3.

FIG. 1 is a perspective view showing an example of a fishing simulation apparatus according to the present invention, FIG. 2 is a side view of FIG. 1, FIG. 3 is a cutaway perspective view showing a half of the apparatus of FIG. 1, and FIG. 4 is a bottom perspective view of FIG. 3. Referring to these figures, the fishing simulation apparatus 1 according to the present invention includes a fishing rod 10, a fishing reel 20 mounted to the fishing rod 10, a main motor 30, and a fishing line 40.

The simulation apparatus 1 is provided with a chair 2, on which a user U sits, and an HMD 3, which the user U wears. The fishing rod 10 is located adjacent to the chair 2, a driving table 50, in which the main motor 30 is mounted, is installed in front of the fishing rod, and the fishing line 40 is introduced from a front end of the fishing rod 10 into the driving table 50 so as to be connected to the main motor 30.

The fishing line 40 according to the present invention is connected in a form in which the fishing line endlessly passes through the fishing rod 10, the fishing reel 20, and the main motor 30 in a circulation manner.

Consequently, the fishing line 40 that passes through the main motor 30 is withdrawn to a position adjacent to the user U through the interior of the simulation apparatus 1 and is connected to the fishing reel 20 of the fishing rod 10 again. In this way, the fishing line continuously circulates.

Figure 5:
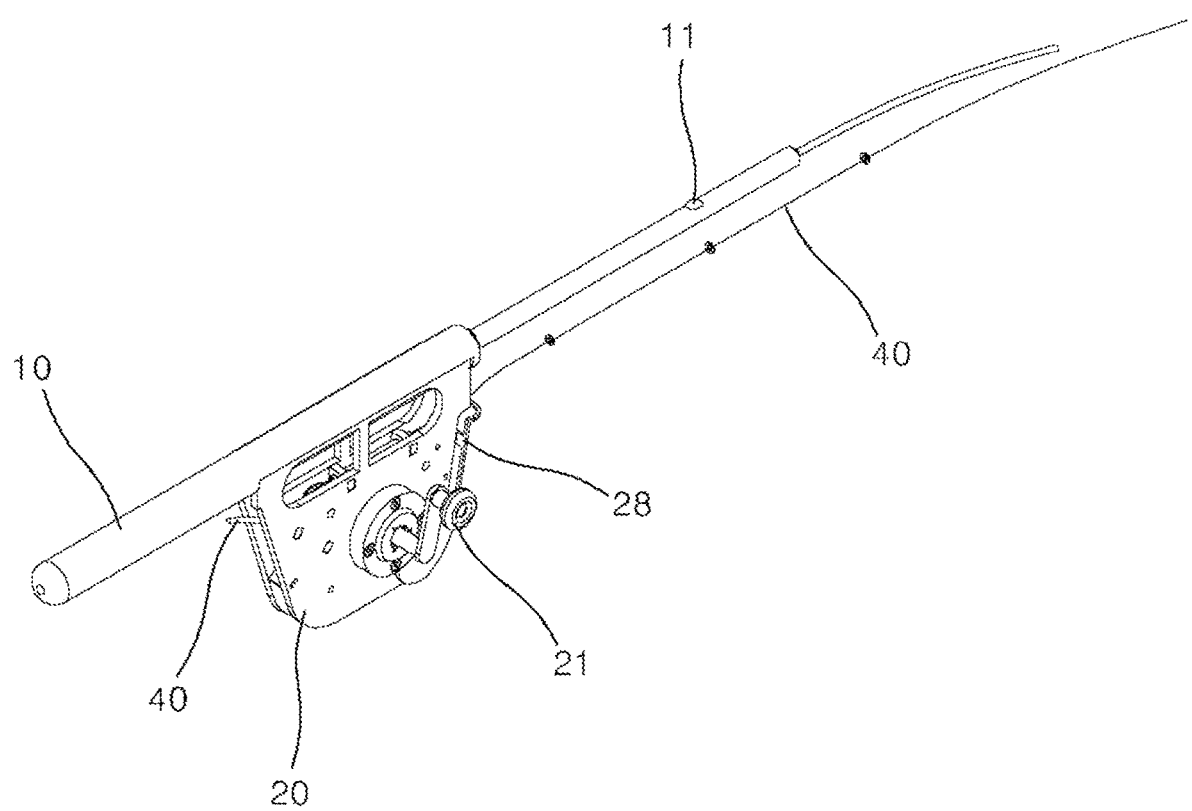
FIG. 5 is a perspective view showing an example of a fishing rod according to the present invention.
Figure 6:
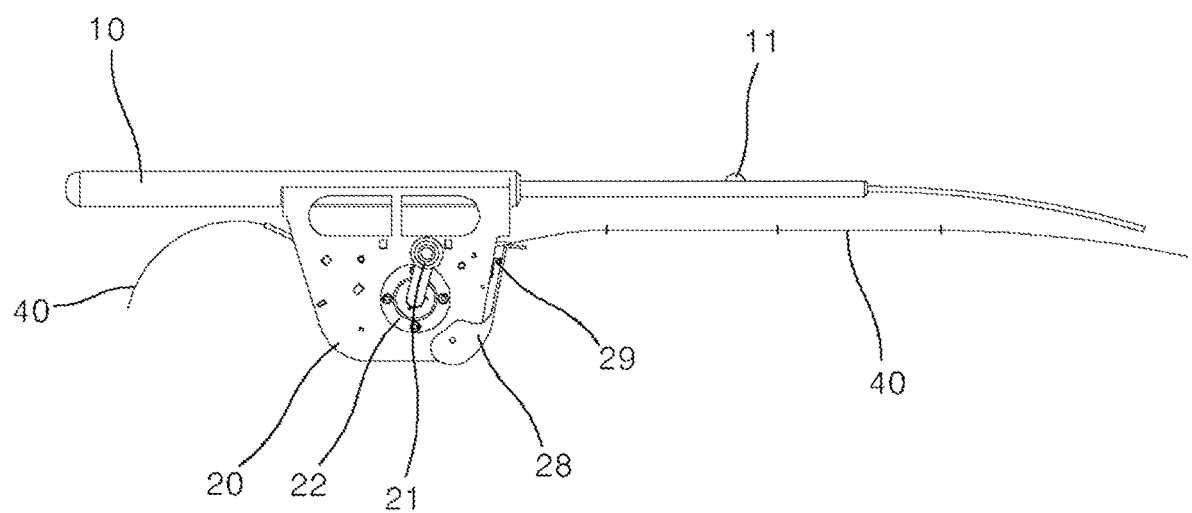
FIG. 6 is a side view of FIG. 5.
Figure 7:
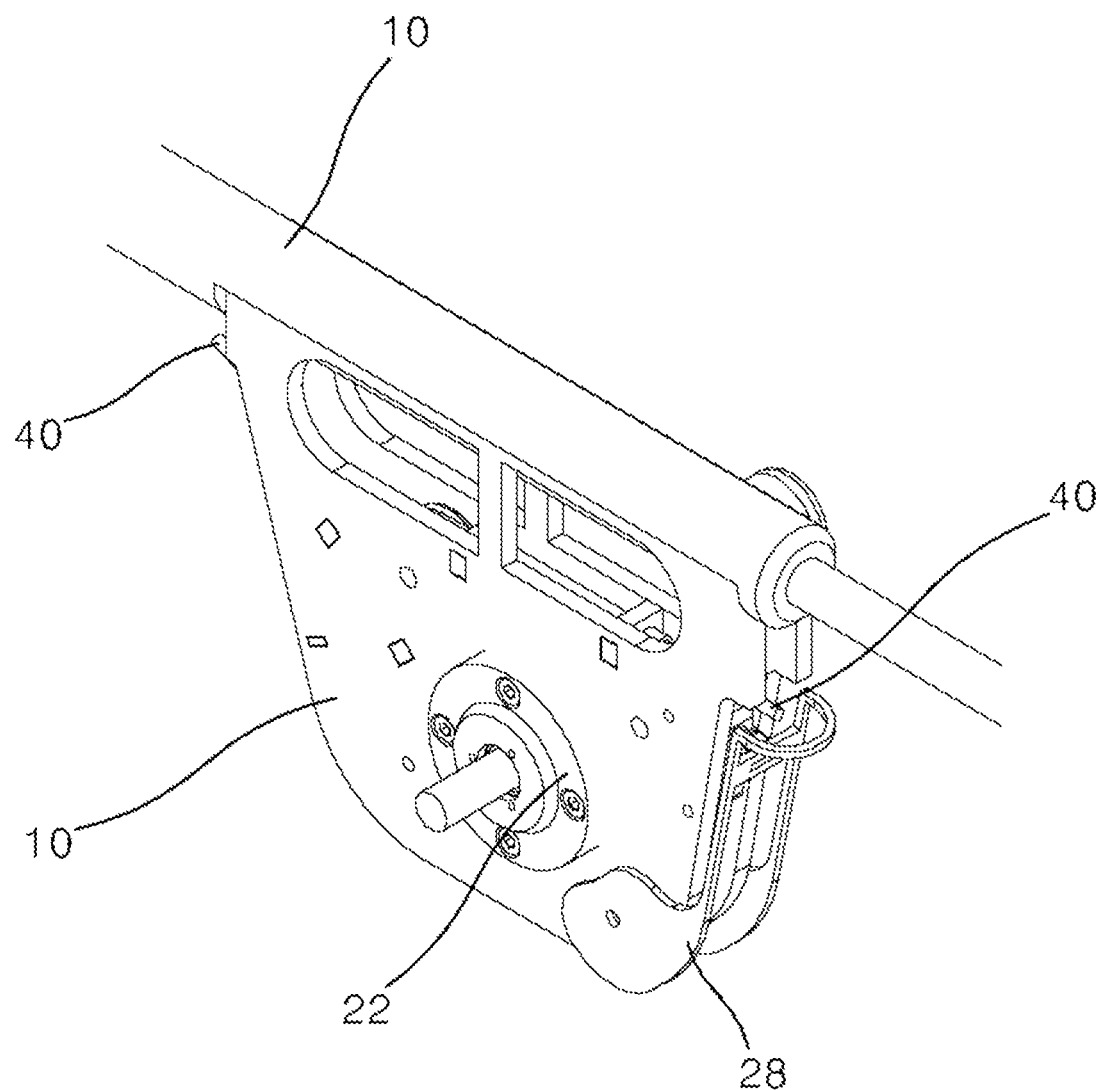
FIG. 7 is a perspective view showing an example of a fishing reel according to the present invention.
Figure 8:
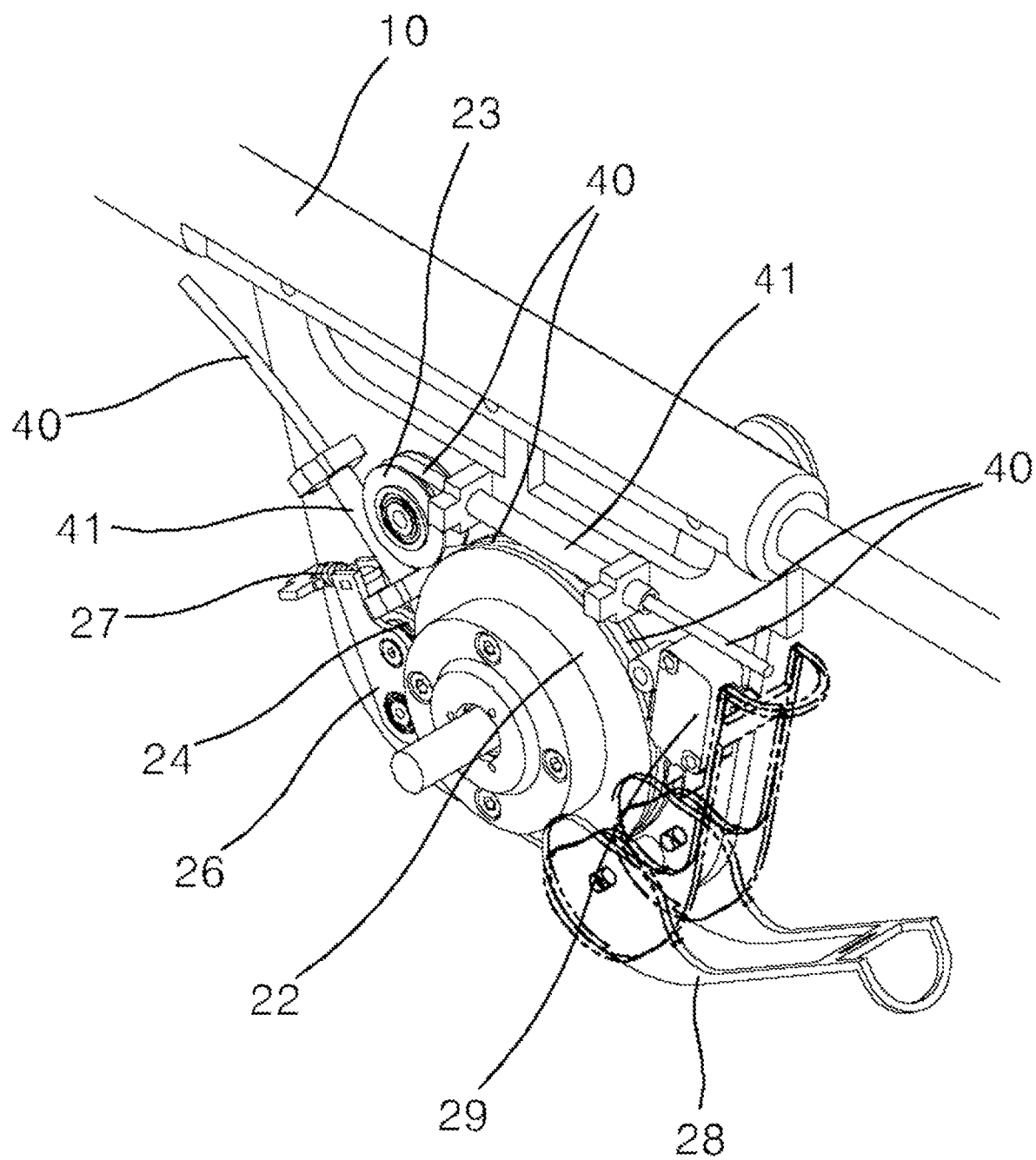
FIG. 8 is a perspective view showing the interior of the fishing reel of FIG. 7.
Figure 9:
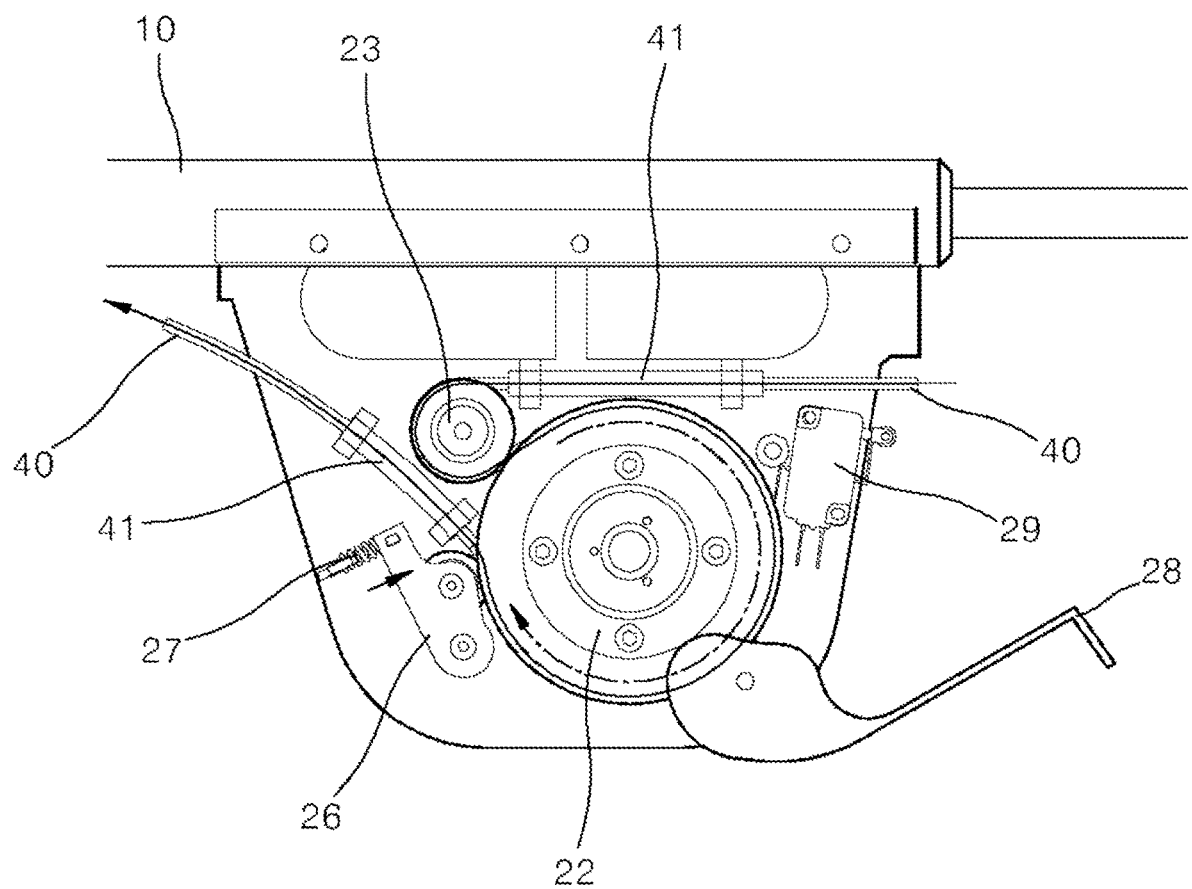
FIG. 9 is a side view of FIG. 8.
Figure 10:
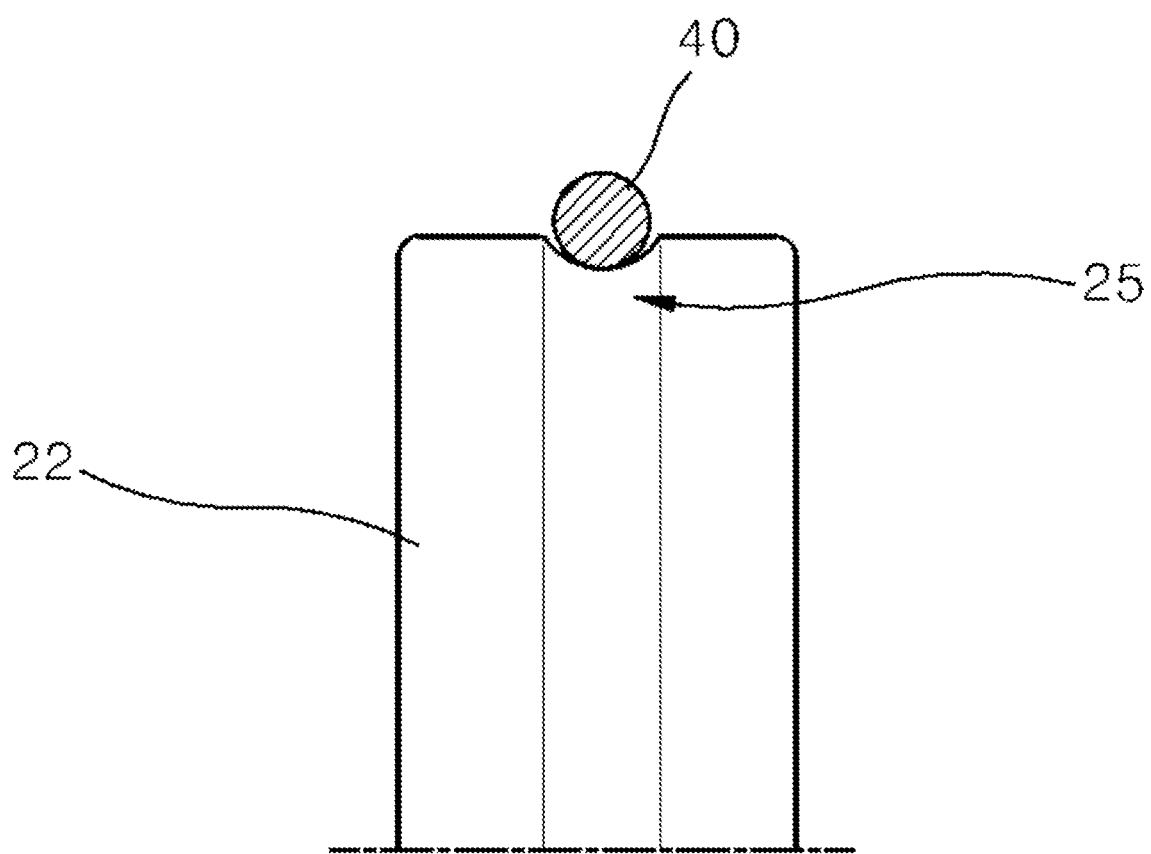
FIG. 10 is a view showing the state in which a driving pulley according to the present invention is in contact with a fishing line.

FIGS. 5 and 6 show an example of the fishing rod according to the present invention, and FIGS. 7 to 9 show an example of the fishing reel according to the present invention. As shown in these figures, the fishing reel 20 is mounted to a rear end part of the fishing rod 10, and the fishing line 40 is manually wound and manipulated by the fishing reel 20.

Any kind of fishing rod, including a real fishing rod that is generally used, may be used as the fishing rod 10, and a tracking sensor 11 is mounted to an arbitrary position of one end of an upper side of the fishing rod.

The fishing reel 20 is provided with a driving pulley 22 configured to be manually driven by a reel handle 21, one or more idler pulleys are installed at the driving pulley 22 so as to be engaged therewith, and the fishing line 40 is wound around the driving pulley 22 such that one side of the fishing line is withdrawn in a direction toward the front end of the fishing rod 10 and the other side of the fishing line is withdrawn in a direction toward a rear end of the fishing rod 10.

Preferably, the idler pulleys engaged with the driving pulley 22 include an input pulley 23 and an output pulley 24, which are installed at an outer circumferential surface of the driving pulley 22 so as to be adjacent to each other.

That is, the input pulley 23 and the output pulley 24 are installed at the outer circumferential surface of the driving pulley 22 in a state of being biased to the rear end part of the fishing rod 10. The fishing line 40 introduced from the front end of the fishing rod 10 is wound around the input pulley 23, is wound one turn around the driving pulley 22, and is withdrawn to a rear side of the fishing rod 10 form a contact point with the output pulley 24.

Consequently, primary frictional force is applied to the fishing line 40 while being wound around the input pulley 23, and the fishing line is maximally wound around an outer circumference of the driving pulley 22 again, whereby frictional force is maximized.

A guide tube 41 is installed on a movement path of the fishing line 40 adjacent to the input pulley 23 and the output pulley 24 such that the fishing line 40 passes through the guide tube 41, the fishing line 40 is prevented from being separated from the pulley and the movement path is accurately maintained, whereby the fishing line is stably wound.

A circumferential reel groove 25 is formed in the outer circumferential surface of the driving pulley 22 in a rotational direction such that the fishing line 40 can be stably wound in a state of being seated in the circumferential reel groove 25. The depth of the circumferential reel groove 25 is set such that the fishing line 40 slightly protrudes outwards from the driving pulley 22, whereby sufficient contact pressure with the idler pulleys may be maintained.

The output pulley 24 may be installed at a free end of a tensioner 26 configured to be turned about a hinge. In this case, the free end of the tensioner 26 is elastically pushed toward the driving pulley 22 by a spring 27 such that the output pulley 24 is elastically brought into tight contact with the driving pulley 22.

A bail 28 configured to be turned about a hinge is installed at a lower end of the front of the fishing reel 20, and a limit switch 29, with which a free end of the bail 28 selectively comes into contact, is installed at the front of the fishing reel. A user's intention to cast or lock the fishing line 40 is transmitted to the main motor 30 as a signal as the result of contact between the bail 28 and the limit switch 29.

In addition, the tracking sensor 11, which is installed at one end of the fishing rod 10, three-dimensionally senses the trajectory of the fishing rod 10 manipulated by the user U, such as casting of bait, such that driving of the main motor 30 is controlled in response thereto.

Figure 11:
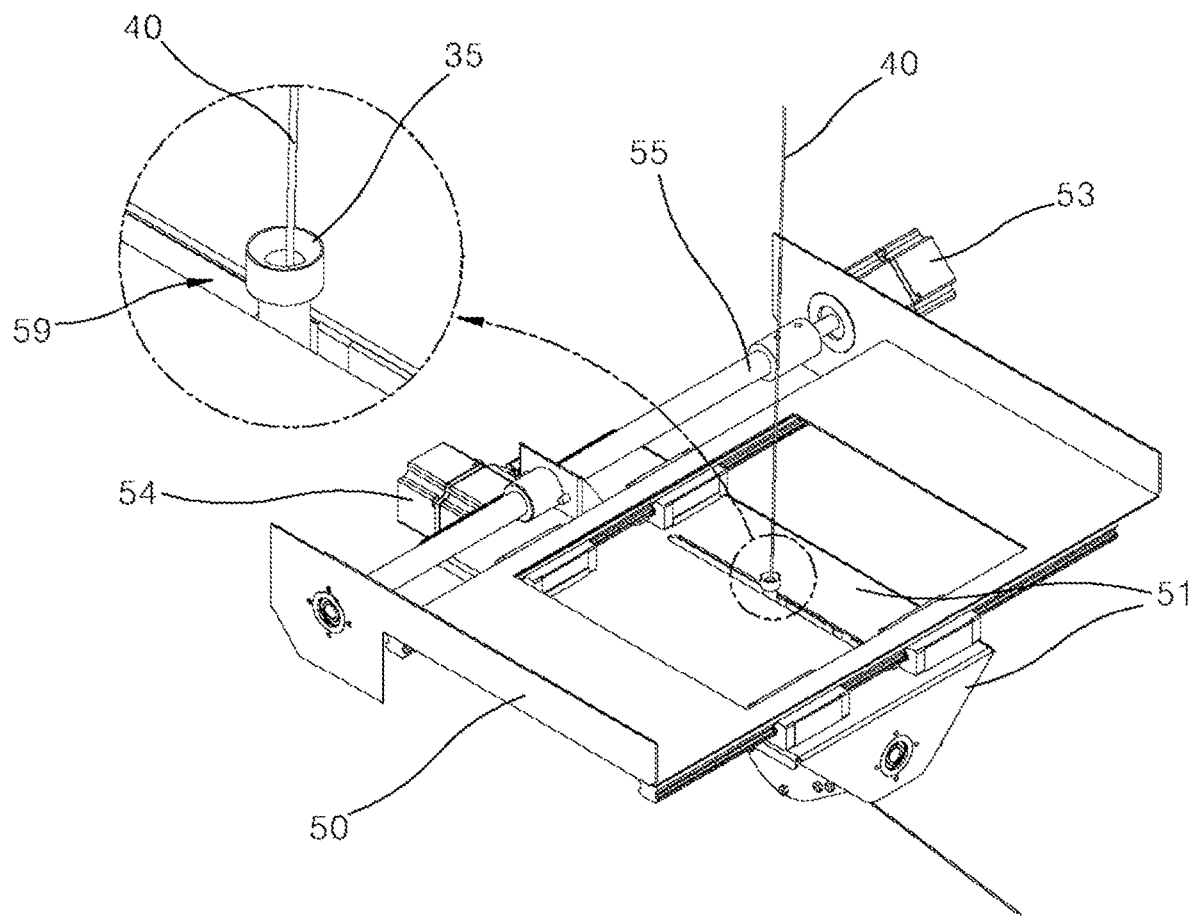
FIG. 11 is a perspective view showing an example of a driving table according to the present invention.
Figure 12:
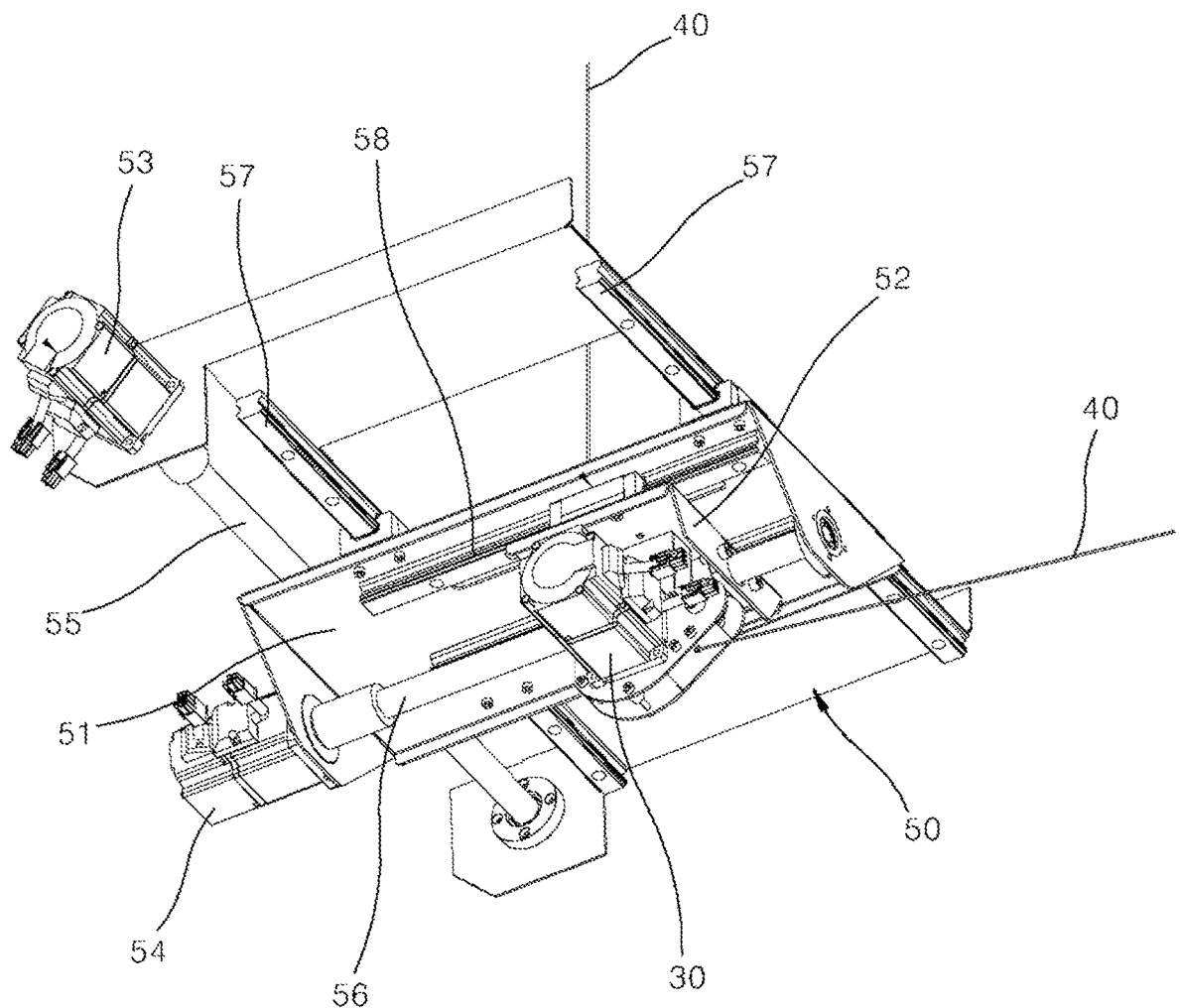
FIG. 12 is a bottom perspective view of FIG. 11.

FIGS. 11 and 12 are a perspective view and a bottom perspective view of the driving table 50 according to the present invention, respectively. Referring to these figures, a central portion of the driving table 50, which is located in front of the fishing rod 10, is open as a moving space of the fishing line 40, a leftward-rightward moving plate 51 configured to be moved leftwards and rightwards by a leftward-rightward moving motor 53 is installed at a lower side of the driving table, and a forward-rearward moving plate 52 configured to be moved forwards and rearwards by a forward-rearward moving motor 54 is installed at a lower side of the leftward-rightward moving plate 51. The main motor 30 is installed at the forward-rearward moving plate 52 so as to be moved together therewith, and a guide slot 59 is formed through the leftward-rightward moving plate 51 so as to extend in a forward-rearward direction such that the fishing line is connected to the main motor.

In order to move the leftward-rightward moving plate 51 leftwards and rightwards, a leftward-rightward actuator 55, which serves as a screw shaft configured to be rotated by the leftward-rightward moving motor 53, is installed at the driving table 50, and the leftward-rightward moving plate is screw-coupled to the leftward-rightward actuator. Leftward-rightward guide rails 57 are installed at the lower side of the driving table 50 such that the leftward-rightward moving plate 51 is movably coupled to the leftward-rightward guide rails.

In addition, a forward-rearward actuator 56, which serves as a screw shaft configured to be rotated by the forward-rearward moving motor 54, is installed at the leftward-rightward moving plate 51, and the forward-rearward moving plate 52 is screw-coupled to the forward-rearward actuator. Forward-rearward guide rails 58 are installed at a lower side of the leftward-rightward moving plate 51 such that the forward-rearward moving plate 52 is movably coupled to the forward-rearward guide rails.

The main motor 30 is installed at the forward-rearward moving plate 52 so as to be moved in conjunction with movement of the leftward-rightward moving plate 51 and the forward-rearward moving plate 52, and the fishing line 40 is connected to the main motor 30.

The fishing line 40 is connected to the main motor 30 through the open central portion of the driving table 50. Since the main motor 30 fixed to the forward-rearward moving plate 52 is moved to the front and the rear of the leftward-rightward moving plate 51, the guide slot 59, which serves as a space in which the fishing line 40 is movable forwards and rearwards, is formed in the leftward-rightward moving plate 51 so as to extend forwards and rearwards, and the fishing line 40 is connected to the main motor 30 through the guide slot 59.

In order for the fishing line 40 to be smoothly connected to the main motor 30 without direct contact with the guide slot 59, a bush 35 is installed at an upper end of the main motor 30 so as to extend through the guide slot 59 such that the fishing line 40 passes through the bush.

In the driving table 50, the leftward-rightward moving plate 51 and the forward-rearward moving plate 52 are moved forwards, rearwards, leftwards, and rightwards according to a sensor and an input program, whereby the main motor 30 simulates motion of a fish while being moved.

The leftward-rightward moving plate 51 and the forward-rearward moving plate 52 are moved by actuators 55 and 56 driven by the leftward-rightward moving motor 53 and the forward-rearward moving motor 54, respectively, and are guided along the leftward-rightward guide rails 57 and the forward-rearward guide rails 58, whereby accurate and rapid motion may be three-dimensionally performed.

A pneumatic cylinder, not the screw shaft, may be used as each actuator.

Figure 13:
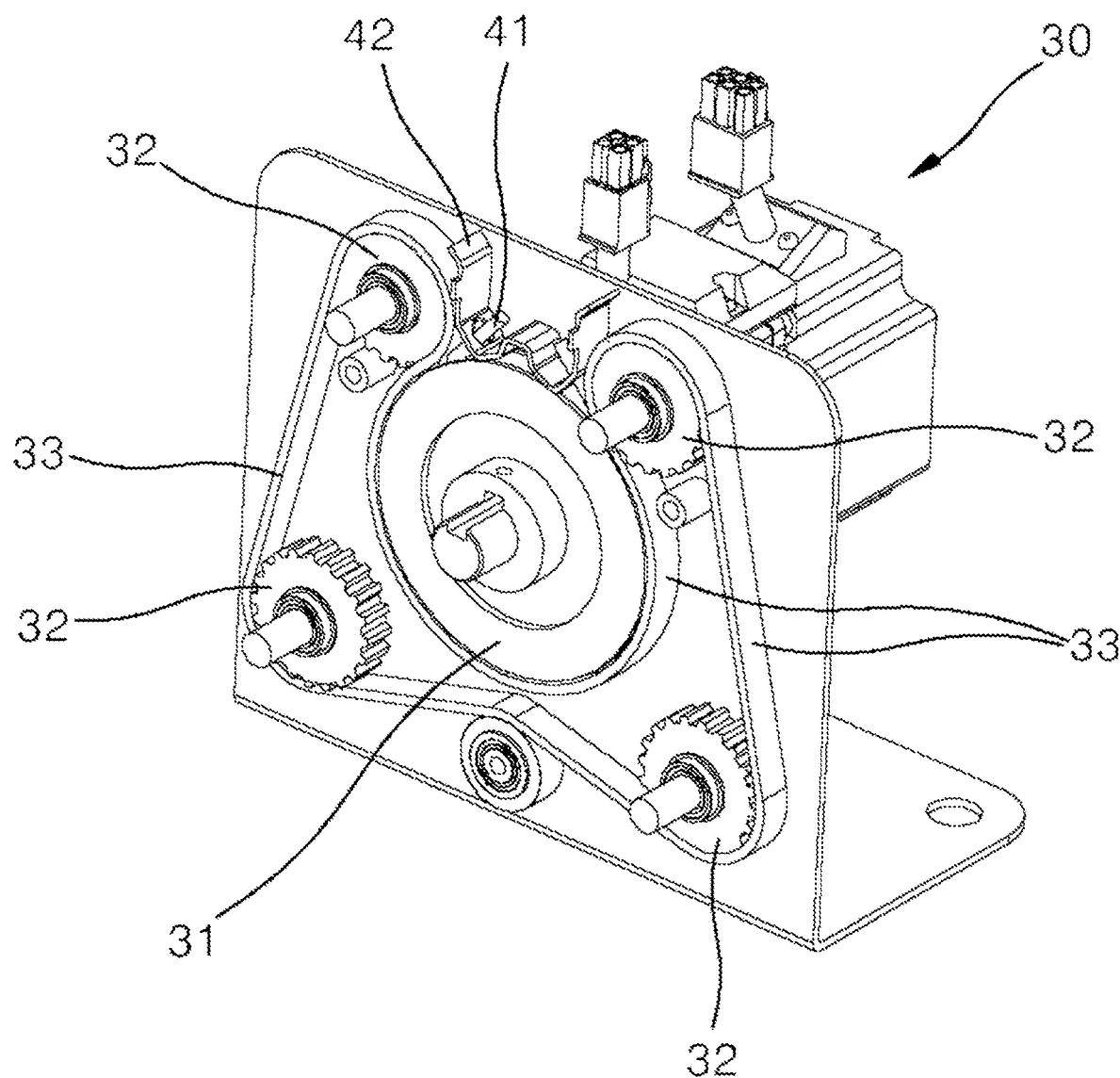
FIG. 13 is a perspective view showing a driving unit of a main motor according to the present invention.
Figure 14:
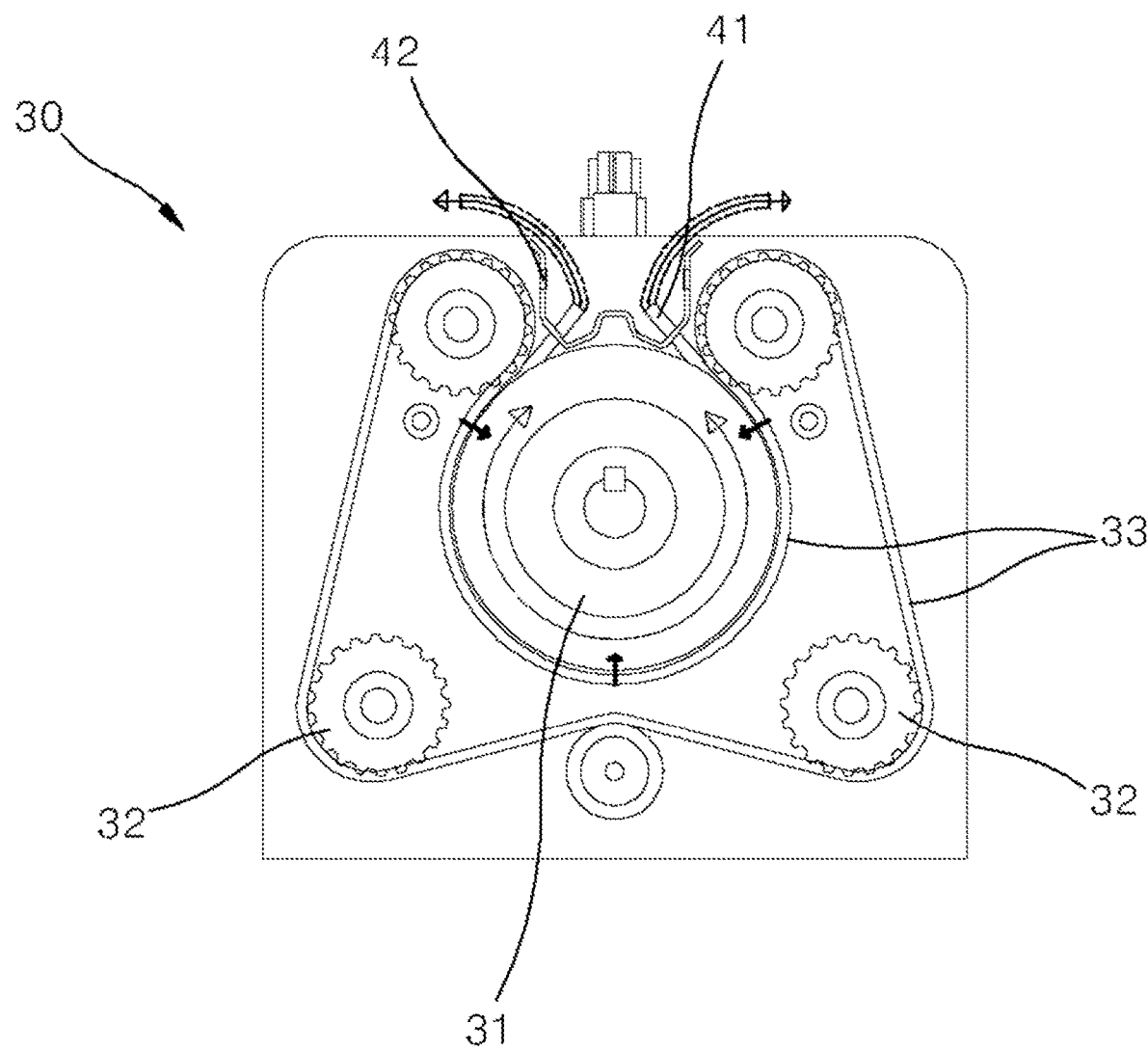
FIG. 14 is a front view of FIG. 13.

FIGS. 13 and 14 show the construction of the main body 30 as an embodiment. Referring to these figures, the main body 30 includes a belt driving pulley 31, around which the fishing line 40 is wound, and a plurality of auxiliary pulleys 32, wherein the fishing line 40 wound around an outer circumferential surface of the belt driving pulley 31 is wrapped by a belt 33 outside the fishing line.

Consequently, the fishing line 40 is not simply wound around an outer surface of the belt driving pulley 31 but the belt 33 is rotated together therewith while securely pushing the fishing line outside the fishing line, and therefore rotational force may be stably transmitted to the fishing line 40 without slip on the outer surface of the pulley.

In particular, among the auxiliary pulleys 32 configured to support the belt, two pulleys adjacent to the belt driving pulley 31 are disposed at adjacent positions after the belt is maximally wound around the belt driving pulley 31, whereby the fishing line 40 and the belt 33 are brought into maximum contact with the belt driving pulley 31. It is preferable for a timing belt to be used as the belt 33 in order to prevent slip thereof.

A circumferential groove 34, in which the fishing line 40 can be seated, may be formed in the outer circumferential surface of the belt driving pulley 31, in the same manner as the circumferential reel groove 25 is formed in the driving pulley 22 of the fishing reel 20, and the fishing line 40 is seated in the circumferential groove 34 such that the fishing line slightly protrudes outside the belt driving pulley 31.

A servomotor is used as the main motor 30, tension of the fishing line may be adjusted by a torque control function of the motor, and an encoder is provided as a sensor configured to sense rotation of the motor.

The fishing line 40 wound around the outer circumferential surface of the belt driving pulley 31 is introduced and withdrawn between two adjacent auxiliary pulleys 32. For smooth introduction and withdrawal, the guide tube 41 is installed so as to be supported by a tube holder 42 such that the fishing line 40 is guided through the guide tube 41, in the same manner as the fishing reel 20.

One side of the fishing line 40 wound around the belt driving pulley 31 of the main motor 30 is connected to the fishing rod 10, and the other side of the fishing line is connected to the fishing reel mounted to the rear end part of the fishing rod 10 via the interior of the simulation apparatus 1 such that the fishing line is circulated infinitely.

In the present invention, a fishing environment may be accurately set according to the input program, and fish species or circumstances may be selectively input so as to be used.

Signals, such as forces that rotate the bail of the fishing reel and the driving pulley of the fishing reel, are comprehensively sensed based on the input program and the tracking sensor of the fishing rod in order to drive the main motor 30, the leftward-rightward moving motor 53, and the forward-rearward moving motor 54.

In addition, the simulation apparatus according to the present invention is provided with a display unit configured to audio visually display a virtual space, wherein it is preferable for the display unit to be constituted by an HMD for virtual reality experience on a helmet that a user wears. In addition, the display unit may be implemented by a screen or a display panel, and content may be changed depending on the input program.

Figure 15:
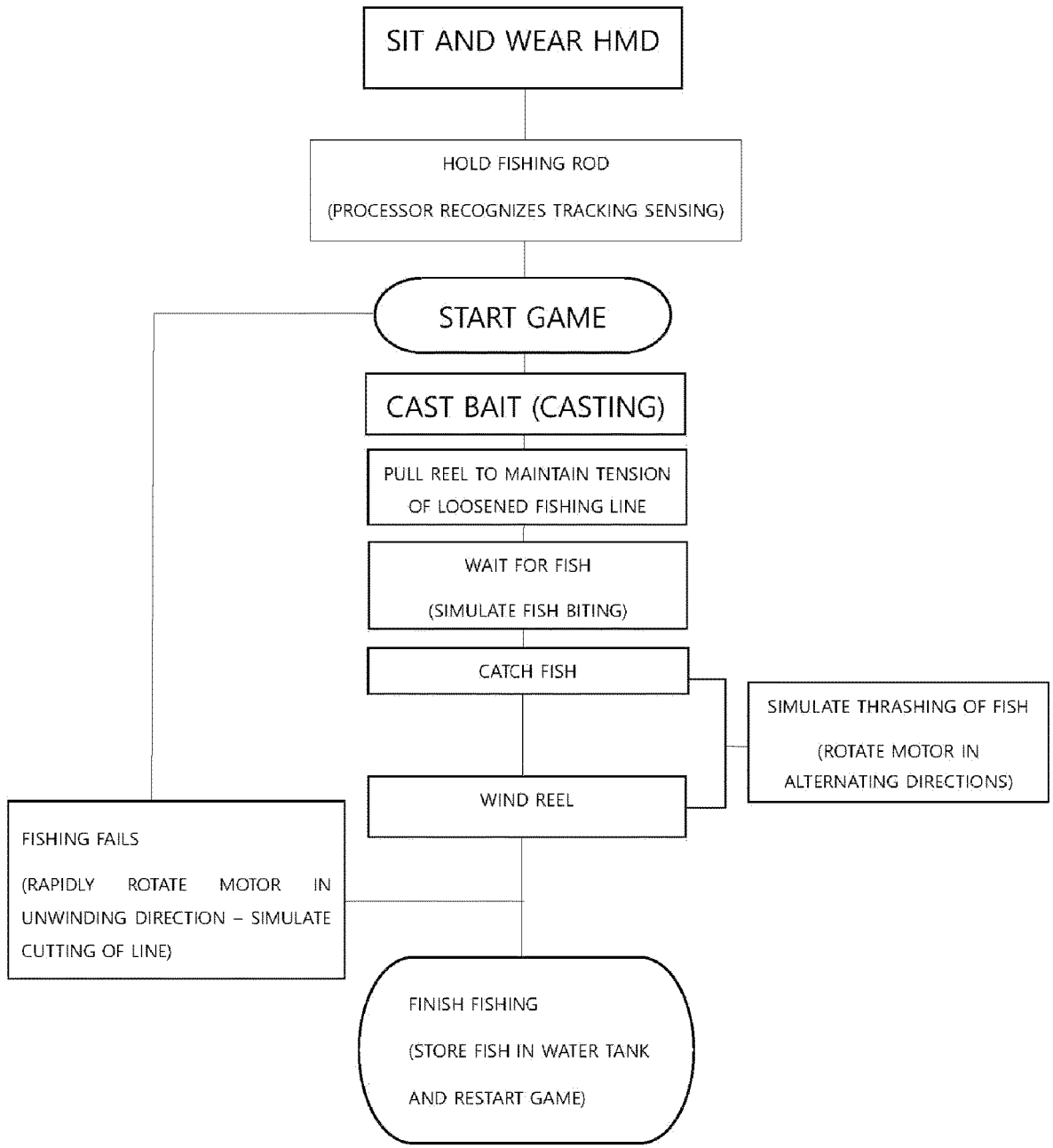
FIG. 15 is a flowchart showing an example of a fishing simulation method according to the present invention.

FIG. 15 is a flowchart showing an example of a fishing simulation method according to the present invention, wherein the fishing simulation method may be performed by the simulation apparatus described above.

Referring to FIG. 15, in a first step (a), when the user U sits on the chair, wears the HMD 3, and holds the fishing rod 10, tracking sensing is recognized by a processor, whereby a game starts. At this time, the fishing line 40 is unwound by the main motor 30, and therefore the fishing line is in a loosened state.

In a second step (b), when bait is cast using the fishing rod 10, the bait is sent far away in a virtual space based on a value calculated by the processor recognizing the speed at which the bait is cast by the arm, and the handle 21 of the fishing reel 20 is rotated to maintain tension of the fishing line. Torque of the main motor by the tension of the fishing line is maintained, and the position of the cast bait and the distance from the castbait are calculated by an encoder of the main motor. The calculated position and distance are transmitted to the processor as a signal.

In a third step (c), the main motor 30 is rotated in alternating directions at short intervals in order to simulate fish biting at bait during waiting for fish. In a fourth step (d), when a fish is caught, the main motor 30 is rotated in alternating directions to simulate thrashing of a fish. That is, change data in length of the fishing line due to fluctuation and movement of the fish are synchronized with the rotation number of the motor, and the main motor 30, the leftward-rightward moving motor 53, and the forward-rearward moving motor 54 are driven through proportional control, whereby motion of the fish is three-dimensionally simulated.

In a fifth step (e), when the handle 21 of the fishing reel 20 is rotated, the main motor 30 is rotated according to winding force of the reel, and rotation data acquired by the encoder are transmitted, whereby the distance from the fish is decreased in the virtual space. Even in this step, the situation of the fourth step is maintained.

At this time, when the fishing reel is wound at higher than allowable torque proportional to the size of the fish or when the fishing rod is excessively pulled, the main motor 30 is rapidly rotated in an unwinding direction to loosen the fishing line 40, whereby a situation in which the line is cut is simulated in a virtual space. The game is restarted and the above routine is repeated.

In a sixth step (f), when fishing is successful, the fish may be stored in a water tank, and the game may be restarted.

In the present invention, content of simulation is virtually displayed such that visual phenomena shown in a virtual space are linked to operation of the apparatus according to the present invention, whereby the user may experience a realistic simulation. Such display may be implemented by an HMD for virtual reality experience.

Consequently, the motor is driven depending on circumstances based on content of the input program and manipulation of the fishing rod and the fishing reel, whereby the user may enjoy virtual fishing having the same realism as the real situation.

The present invention described and shown above is not limited to the above embodiment, and may be implemented in various forms without departing from the gist of the present invention.

In addition, a detailed description of mechanical elements that can be basically and arbitrarily used, i.e. universal components, such as a reducer used in the motor, a hinge, a bearing, and electrically connected components, was omitted from the above description.

INDUSTRIAL APPLICABILITY

In a fishing simulation apparatus according to the present invention, a fishing line configured to be continuously circulated infinitely is used, whereby the length of the fishing line is not limited, and therefore it is possible to enjoy sufficient casting and reeling. Furthermore, tangling of the fishing line is prevented, and when fishing is finished or the game is to be restarted during the game, rewinding of the fishing line is unnecessary, which overcomes inconvenience in resetting, such as rewinding, of the fishing line, whereby it is possible to more conveniently and realistically enjoy virtual fishing. Therefore, industrial applicability of the present invention is high.

The invention claimed is:

1. A fishing simulation apparatus comprising:
a fishing reel mounted to a fishing rod, the fishing reel including a manual driving pulley configured to allow a fishing line to be wound therearound, such that the fishing line is movable in forward and rearward directions;
a main motor configured to tow the fishing line connected to the fishing rod and the fishing reel, the main motor including a belt driving pulley around which the fishing line is wound and a plurality of auxiliary pulleys configured to guide the fishing line, the belt driving pulley being wrapped by a belt positioned outside the fishing line to prevent slip, wherein the fishing line is connected in an infinite circulation manner while sequentially passing through the fishing rod, the fishing reel, and the main motor, thereby eliminating a need for rewinding or resetting the fishing line after a cast; and
a display unit configured to audio visually display a virtual fishing space, the display unit including a wearable Head Mounted Display (HMD) configured to enhance immersion and provide realistic fishing experience.

2. The fishing simulation apparatus according to claim 1, wherein
the driving pulley is engaged with an idler pulley,
the idler pulley comprises an input pulley and an output pulley, and
the input pulley and the output pulley are installed at an outer circumferential surface of the driving pulley so as to be adjacent to each other, whereby the fishing line contacts the outer circumferential surface of the driving pulley, such that frictional force is increased.

3. The fishing simulation apparatus according to claim 2, wherein
the output pulley is installed at a free end of a tensioner configured to pivot about a hinge, and
a spring is installed at the tensioner such that the output pulley elastically contacts the driving pulley.

4. The fishing simulation apparatus according to claim 1, further comprising a guide tube configured to allow the fishing line to pass therethrough, the guide tube being installed at a position adjacent to the driving pulley or the idler pulley engaged with the driving pulley.

5. The fishing simulation apparatus according to claim 1, wherein a circumferential reel groove configured to allow the fishing line to be seated therein is formed in an outer circumferential surface of the driving pulley in a rotational direction.

6. The fishing simulation apparatus according to claim 1, wherein
   a bail configured to pivot about a hinge and a limit switch configured to allow a free end of the bail to selectively come into contact therewith are installed at the fishing reel, and
   a signal for unwinding the fishing line or maintaining tension of the fishing line is applied to the main motor as a result of contact between the bail and the limit switch.

7. The fishing simulation apparatus according to claim 1, further comprising a guide tube configured to allow the fishing line wound around the belt driving pulley to pass therethrough, the guide tube being installed at a position adjacent to the belt driving pulley.

8. The fishing simulation apparatus according to claim 1, wherein
   a leftward-rightward moving plate configured to be moved leftwards and rightwards by a leftward-rightward moving motor is installed in front of the fishing rod,
   a forward-rearward moving plate configured to be moved forwards and rearwards by a forward-rearward moving motor is installed at a lower side of the leftward-rightward moving plate,
   the main motor is installed at the forward-rearward moving plate so as to be moved together therewith, and
   a guide slot is formed in the leftward-rightward moving plate so as to extend in the forward and rearward directions such that the fishing line is connected to the main motor.

9. The fishing simulation apparatus according to claim 8, wherein a bush configured to allow the fishing line to pass therethrough is installed at an upper end of the main motor so as to extend through the guide slot.

10. The fishing simulation apparatus according to claim 1, wherein the display unit further includes a screen or a display panel.

11. The fishing simulation apparatus according to claim 1, further comprising a tracking sensor configured to sense a motion of the fishing rod and to output a signal corresponding thereto.

12. A fishing simulation method, comprising:
   a first step in which, when a user wears a Head Mounted Display (HMD) and holds a fishing rod, tracking sensing is recognized by a processor, and a fishing line is unwound by a main motor such that the fishing line is in a loosened state;
   a second step in which, when a bait is cast using the fishing rod, the bait is sent away in a virtual space based on a value calculated by the processor recognizing a speed of the cast by the user's arm, when the loosened fishing line is wound, a torque of the main motor by the tension of the fishing line is maintained, a position of the cast bait and a distance from the cast bait are calculated by an encoder of the main motor, and the calculated position and distance are transmitted to the processor as a signal to maintain tension of the fishing line;
   a third step in which the main motor is rotated in alternating directions at short intervals in order to simulate fish biting at bait during waiting for fish;
   a fourth step in which, when a fish is caught, change data in length of the fishing line due to fluctuation and movement of the fish are synchronized with a rotation number of the motor, and the main motor is rotated in the alternating directions through proportional control, whereby thrashing of the fish is simulated;
   a fifth step in which, when a handle of a fishing reel is rotated, the main motor is rotated according to winding force of the reel, and rotation data acquired by the encoder are transmitted, whereby a distance from the fish is decreased in the virtual space; and
   a sixth step in which, when fishing is successful, the fish is stored in a water tank, and a game is restarted, wherein
   when the fishing reel is wound at higher than an allowable torque proportional to a size of the fish or when the fishing rod is excessively pulled in the fifth step, the main motor is rapidly rotated in an unwinding direction to loosen the fishing line, whereby a situation in which the line is cut is simulated in the virtual space, and the game is restarted.

13. The fishing simulation method according to claim 12, wherein the main motor is moved forwards, rearwards, leftwards, and rightwards as a result of driving of a leftward-rightward moving motor and a forward-rearward moving motor in the fourth step and the fifth step, whereby a motion of the fish is three-dimensionally simulated.

14. The fishing simulation apparatus according to claim 2, wherein a guide tube configured to allow the fishing line to pass therethrough is further installed at a position adjacent to the driving pulley or the idler pulley engaged with the driving pulley.

* * * * *